United States Patent [19]

D'Alelio et al.

[11] 3,933,690

[45] Jan. 20, 1976

[54] DIHALOBUTENEDIOL CONTAINING URETHANE FOAM COMPOSITIONS

[75] Inventors: Gaetano F. D'Alelio, South Bend, Ind.; Erich Kuehn, Wilmington, Del.

[73] Assignee: ICI United States Inc., Wilmington, Del.

[22] Filed: Dec. 13, 1973

[21] Appl. No.: 426,728

Related U.S. Application Data

[62] Division of Ser. No. 123,109, March 10, 1971, Pat. No. 3,812,047.

[52] U.S. Cl... 260/2.5 AM; 260/2.5 AJ; 260/2.5 AS
[51] Int. Cl.$^2$................. C08G 18/14; C08G 18/32; C08G 18/48
[58] Field of Search..... 260/2.5 AM, 2.5 AJ, 2.5 AS

[56] References Cited
UNITED STATES PATENTS

| | | | |
|---|---|---|---|
| 3,723,392 | 3/1973 | Konig | 260/75 NP |
| 3,764,546 | 10/1973 | Feltzin | 260/2.5 AM |
| 3,779,953 | 12/1973 | Papa | 260/2.5 AJ |
| 3,812,047 | 5/1974 | D'Alelio | 260/2.5 AM |

FOREIGN PATENTS OR APPLICATIONS

| | | |
|---|---|---|
| 45,999 | 1/1970 | Japan |
| 4,536,428 | 11/1970 | Japan |
| 1,502,050 | 11/1967 | France |

OTHER PUBLICATIONS

"Dibromobutenediol, A New Flame Retardant Monomer for Polyurethane, Polyester, and Epoxy Systems", G.A.F. Bulletin No. 9649-001, 1971, 4 pages.
"A New Route to Flame Resistant Thermoplastic Polyurethane", G.A.F. Bulletin No. 9649-006; 1971; 8 pages.
Rough Draft Partial Translation of Japanese No. 45-999.
Rough Draft Partial Translation of Japanese 45-36428.

*Primary Examiner*—C. Warren Ivy

[57] ABSTRACT

Polyol blends which comprise a mixture of dihalobutenediol and polyhydroxy compounds wherein the hydroxyl number of the mixture is from about 200 to 800 are disclosed. A process for preparing polyol blends and flameretardant polyurethane compositions using the polyol blends are also disclosed.

5 Claims, No Drawings

DIHALOBUTENEDIOL CONTAINING URETHANE FOAM COMPOSITIONS

This application is a division of our copending U.S. patent application Ser. No. 123,109, filed Mar. 10, 1971, now U.S. Patent No. 3,812,047.

This invention relates to novel polyol blends, to a process for preparing these compositions, and to flame-retardant polyurethane foam compositions prepared from these polyol compositions. More particularly, this invention relates to polyol blends and polyurethane foam compositions which contain dihalobutenediol and to a process for preparing a blend of dihalobutenediol and a polyhydroxy compound. Still, more particularly, this invention relates to flame-retardant foams derived from polyol blends containing dihalobutenediol and to the particular polyol blends used in the preparation of the foams.

Polyurethane foams, for reasons of economy and ease of handling, have become widely used as insulating materials in the construction and manufacturing arts. Notwithstanding that polyurethane and similarly constituted foams are excellent insulating materials by reason of their characteristic property of a low specific heat, this property itself frequently causes such foams to build up heat excessively within the surface layers thereof, which may result in the ignition of the foams. In the past, efforts have been made to overcome the disadvantage arising from the use of polyurethane and similar foams in the construction and other industries by adding to such foams a variety of additives, such as phosphorus and halogen-containing compounds, which tend to inhibit the flammability thereof. Frequently, however, the use of additives of the aforementioned kind results in difficulties in the preparation of the flame-retardant polyurethane foams arising from compatability problems with the reactant materials. Therefore, polyurethane foams prepared from reactant materials which would impart the characteristic of flame-retardancy thereto without the inclusion of possible incompatible additives represents a desirable advance in the art.

It is, accordingly, an object of this invention to provide a novel fire-retardant polyurethane foam composition.

It is another object of this invention to provide a novel polyol blend for use in said flame-retardant polyurethane foam compositions.

It is another object of this invention to provide novel processes for the preparation of said polyol blends. Still other objects of this invention will become evident to those skilled in the art from the following detailed description of the invention.

Broadly, the polyol blends of this invention are mixtures of dihalobutenediol and organic polyhydroxy compounds wherein the hydroxyl number of the resulting polyol blend is from about 200 to about 800 and the weight percent of the dihalobutenediol in said blend is at least about 10%.

In a class of polyol blend of this invention the weight percent of 2,3-dihalo-2-butene-1,4-diol based on the blend of diol and polyhydroxy compound does not exceed 60%. In a preferred polyol blend the weight percent of the 2,3-dihalo-2-butene-1,4-diol is from about 15 to about 40% based on the total weight of the diol and polyhydroxy compound and the hydroxyl number of the diol and polyol blend is from 300 to 600.

Among the 2,3-dihalo-2-butene-1,4-diols used in accordance with this invention are dibromobutenediol, dichlorobutenediol, and diiodobutenediol. The preferred diol is dibromobutenediol.

Exemplary of the polyhydroxy compounds which can be used in conjunction with the dibromobutenediol to prepare polyol blends within the polyol blends of this invention are polyhydroxy alkanes, alkoxylated polyhydroxy alkanes, sugars, alkoxylated sugars, hydroxyl terminated polyesters, hydroxyl terminated aromatic polyethers, and methylolated or alkoxylated amines.

More particularly within the category of polyhydroxy alkanes are included sugar alcohols, and glycols: for example, ethylene glycol, propylene glycol, butanediol, sorbitol, glycerine, erythritol, threitol, and 1,2,5,6-hexanetetrol.

The alkoxylated polyhydroxy alkanes include the reaction product of an alkylene oxide or arylene oxide with a polyhydroxy alkane within the above-described class. The oxide which can be used in preparing the oxide derivatives can be any which is reactive with the polyhydroxy alkane without excessive degradation occurring. Among the oxides within this class are ethylene oxide, propylene oxide, butene oxide, and styrene oxide. The mols of oxide per hydroxyl group of polyhydroxy alkane are usually from 1:1 to about 20:1. Included as a polyhydroxy alkane are those polyethers represented by the formula

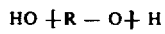

where R is an alkenyl radical or an aryl substituted alkenyl radical and said alkenyl radical contains up to 4 carbon atoms.

The hydroxyl terminated aromatic polyethers which may be used as part of the polyol blend of the invention include polyphenyl ethers, and the reaction product of aromatic diols such as bisphenol A and an alkylene oxide. In all cases the aromatic polyethers have an ether linkage directly to the aromatic nucleus. Examples of the polyethers are polyoxyethylene (10)-2,2-bis(4-hydroxyphenyl)propane, polyoxystyrene(40)bis (2,6-dibromo-4-hydroxyphenyl)ethane and

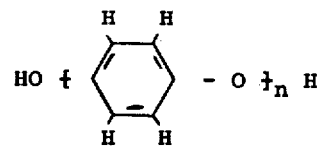

The sugars contemplated include mono- and disaccharides such as glucose, fructose, maltose, sucrose and mannose. The alkoxylated sugars include sugars containing up to about 10 oxyalkylene or oxyarylene groups per hydroxyl group of said sugar. Examples of these alkoxylated sugars include polyoxystyrene(10) sucrose, polyoxybutylene(6)glucose, polyoxyethylene(8)maltose.

The hydroxyl terminated polyesters which can be used are those hydroxyl terminated polyesters which are liquid at room temperature and may include the reaction products of saturated or unsaturated diacids with dihydroxy compounds. Examples of the acids include phthalic, succinic, adipic, fumaric, maleic, and bis(4-carboxyphenyl)propylene. The dihydroxy materials include diols such as butanediol, hexanediol, tetrabromobisphenol A, bis(4-hydroxyphenyl)ethylene, dibromobisphenol A, and alkoxylated derivatives of such dihydric materials.

Amines which can be used as hydroxyl bearing compounds are methylolated and alkoxylated aliphatic and aryl amines. More particularly, methylolated and alkoxylated amines which can be used in preparing the polyol blends of this invention include methylolated guanamines, methylolated melamine, alkoxylated melamines and guanamines, and methylolated and alkoxylated diamines and monoamines which contain at least one primary amine group. Examples of these amines include polyoxyethylene(7)-2,4-diamino-6-phenyl-s-triazine (more commonly called polyoxyethylene (7)benzoguanamine); 2,4,6-tris[bis(hydroxymethyl)-amino]-s-triazine; N,N-bis(hydroxymethyl), N'-methyl, tetramethylene diamine; N,N,N',N'-tetrakis(-hydroxymethyl)pentamethylene diamine; N,N-bis(hydroxymethyl) N'-ethyl, N'-propyl, tetramethylene diamine; and N'N'-bis(hydroxymethyl)propylamine.

The polyol blend of this invention may be prepared in various ways. The polyol blend may be prepared by mixing 2,3-dihalo-2-butene-1,4-diol with a polyhydroxy compound wherein the nature and amount of the polyhydroxy compound is chosen to achieve a polyol blend having a hydroxyl number of between about 200 and about 800. A preferred process for preparing the polyol blend of this invention comprises mixing 2-butyne-1,4-diol with an amine free polyhydroxy compound in a ratio so that at least about 3½ weight percent of the mixture is 2-butyene-1,4-diol and adding halogen, e.g. bromine, to the mixture at a temperature of less than about 100°C. and in a molar ratio sufficient to substantially halogenate the 2-butyne-1,4-diol to 2,3-dihalo-2-butene-1,4-diol. The final mixture of dihalobutenediol and the polyhydroxy compound will have a hydroxyl number of about 200 to about 800. The reason the temperature of this reaction is generally maintained below 100°C. is not because of lack of halogenation potential at temperatures above 100°C. but rather that at temperatures exceeding 100°C. undesirable side reactions may occur which may limit the utility of the final polyol blend. More particularly, the molar ratio of halogen to butynediol during the course of the halogenation reaction may vary from about 0.9 to 1.2 and the temperature of the reaction may be from −5°C. to 25°C.

The polyol blend prepared according to the above preferred process will be a relatively stable blend of the dibromobutenediol and the particular polyhydroxy compound which constitutes the second member of the blend. Naturally, mixtures of more than one polyhydroxy compound can be used in preparing the blends of this invention. However, as indicated above, polyol blends containing methylolated or alkoxylated amines cannot be used in the in situ halogenation and thus polyol blends containing a methylolated or alkoxylated amine are prepared by alternate processes.

The following are representative examples of polyol blends which are within the scope of this invention and the process for preparing such blends:

EXAMPLE 1

43.5 grams of 2-butyne-1,4-diol are dissolved in distilled water at room temperature. To this solution of butynediol, 81.5 grams of bromine are added dropwise over a period of 30 minutes. During the addition of the bromine to the butynediol solution the reaction vessel is cooled in a water bath and a temperature is maintained between 25° and 35°C. The solution during the addition of the bromine is continually stirred with a magnetic stirrer. After the entire amount of bromine is added, the solution is stirred for an additional 15 minutes to insure the complete reaction of the bromine with the butynediol. The product is a quantitative yield of 2,3-dibromo-2-butene-1,4-diol. To this homogeneous solution is then added 375 grams of polyoxypropylene (8) sorbitol at a concentration of 95 weight percent solids in an aqueous solution. This mixture of polyoxypropylene(8)sorbitol and dibromobutenediol is then stirred until homogeneous. After homogeneity is reached the solution is yellow and slightly hazy. This slightly hazy solution is then heated for 15 minutes at 70°C. until it is completely clear. The aqueous solution is then passed through a cation exchange column to remove undesirable acid by-products. Then the water is removed under vacuum at 75°C. and the final polyol blend has a dark color and has a hydroxyl number of 455.

EXAMPLE 2

43.5 grams of 2-butyne-1,4-diol, 375 grams of polyoxypropylene (8) sorbitol and 350 grams of distilled water are mixed together until a homogeneous solution is formed. This resultant solution is then cooled to a temperature between 25° and 35°C. and over a period of 30 to 60 minutes 81.5 grams (37.85 ml) of bromine is added with stirring. After the completion of the bromine addition, the solution is stirred for an additional 15 minutes to insure complete reaction. The resultant reaction mixture is then cation exchanged and finally the water is removed under vacuum at a temperature from between 70° and 75°C. The polyol blend has a hydroxyl number of 480 and an acid number of 8. The final color of the polyol blend is a dark brown.

EXAMPLE 3

According to the procedure of Example 2, a polyol blend is prepared from 10½ grams of 2-butyne-1,4-diol, 100 grams of polyoxyethylene(6)sorbitan, 70 grams of polyoxypropylene(10) glycerine and 29½ grams of bromine. The hydroxyl number of this polyol blend is 337.

EXAMPLE 4

According to the procedure of Example 1, 100 grams of 2,3-dibromo-2-butene-1,4-diol in an aqueous solution and 100 grams of polyoxypropylene diethylene triamine are dissolved in 200 grams of water. After cation exchanging the final polyol blend has a hydroxyl number of 462.

EXAMPLE 5

60 grams of a polyester, prepared by heating 177.9 grams of glycerine and 416.2 grams of phthalic anhydride in the presence of potassium hydroxide catalyst to 140°C. and then adding 288 grams of propylene oxide, is blended with 40 grams of dibromobutenediol in an aqeuous solution according to the procedure of Example 1. The final blend of polyol has a hdyroxyl number of 433.

EXAMPLE 6

According to the procedure of Example 1, 100 grams of dibromobutenediol in an aqueous solution, 40 grams of sorbitol, and 60 grams of polyoxypropylene(10) sorbitol are blended and cation exchanged. The final polyol blend has a hydroxyl number of 730.

EXAMPLE 7

According to the procedure of Example 1, 60 grams of 2,3-dichloro-2-butene-1,4-diol, 20 grams of glycerol, and 120 grams of a propylene glycol polyether having an average molecular weight of 500 are blended in a mixer. The resulting polyol composition is cation exchanged and found to have a hydroxyl number of 500.

In accordance with the present invention, the above-described polyol compositions may be used to prepare flame-retardant polyurethane foam compositions comprising an organic multifunctional isocyanate and an above-described polyol composition.

In general, the foams of this invention are prepared by reacting a polyol blend in accordance with this invention with an organic multifunctional isocyanate in a ratio suitable to provide from about 0.8 to 1.3 isocyanate groups per hydroxyl group of said polyol blend. A preferred ratio of isocyanate groups to hydroxyl groups is from about 0.95 to about 1.05.

The conditions under which the urethane foam is prepared are not critical. Temperatures as low as −40°C. may be used if proper catalyst concentration is used and if the mixture does not become too viscous. The upper temperature is limited only by the volatility of the reactants. A practical temperature range is from about 0° to about 60°C. The process can be carried out by both continous and batch processing techniques.

A wide variety of organic isocyanate compounds may be used to prepare the novel polyurethane foam compositions among which are included diphenyl diisocyanate; toluene diisocyanate; chloro-phenyl-2,4-diisocyanate; 1,4-tetramethylene diisocyanate; p-phenylene-diisocyanate; 3,3-dimethyl-4,4'-phenylene diisocyanate; 3,3'-dimethoxy-4,4'-biphenylene diisocyanate; polymethylene polyphenyl polyisocyanate (PAPI, which is an essentially tri-functional, dark colored liquid); methylene bis (4,4'-phenyl polyisocyanate) (Mondur MR, which is primarily diphenyl methane 4,4'-diisocyanate, but has an average isocyanate group content of about 2.5 per molecule); and other polymethylene polyphenyl isocyanates containing in average of from about 2.2 through 3.3 NCO groups per molecule.

Catalysts which may be used in the preparation of polyurethane foams of this invention may include amine catalysts and tin catalysts or mixtures thereof. Among the suitable amine catalysts are N-alkyl morpholines such as N-methyl morpholine and N-ethyl morpholine, tertiary amines such as trimethyl amine, triethyl amine, tetramethyl guanidine, triethylenediamine, N,N,N',N'-tetramethyl-1,3-butanediamine; dimethyl ethanolamine, piperazine and piperazine derivatives, such as N-methyl piperazine, and 1,4-diazabicyclo(2.2)octane. Amine catalysts may be present in amounts from about 0.05% to about 2.0% by weight based on the weight of the reaction mixture. Among the suitable thin catalysts are included dialkyl tin laurates (such as dibutyl tin dilaurate), dibutyl tin-di-2-ethyl hexoate, dibutyl tin diacetate, stannous oleate, and stannous octoate. Tin catalysts may be present in amounts from about 0.01% to about 1.0% by weight based on the weight of the reaction mixture.

In a preferred embodiment of preparing the polyurethane foam compositions, a surface active agent and a foaming agent are used. Examples of useful surface active agents which can be present in amounts of from about 0.05% to about 2% by weight of the hydroxy-bearing compounds used to prepare the polyurethane foams of this invention are water-soluble siloxane-oxyalkylene block copolymers as described in U.S. Pat. No. 2,834,748 to Bailey et al., issued May 13, 1958. A typical organo-silicon surfactant is L5310 available from Union Carbide Co. Other surfactants which may be used are condensates of ethylene oxide with a hydrophobic base formed by condensing propylene oxide with propylene glycol. These surfactants have a molecular weight within the range of about 2000 to about 8000 and are generally ascribed the formula

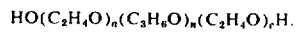

HO(C₂H₄O)ₙ(C₃H₆O)ₙ(C₂H₄O)ₓH.

"L-5320 Silicone" is the Union Carbide Company's propriatary name for its low viscosity organo-silicone having a hydroxyl number of approximately 170 and which is a liquid organo-silicone surfactant. Its solid counterpart is designated to the trade as "L-5310" and is covered by British Patent No. 1,015,611.

Dow Corning 195 Surfactant is a siliconeglycol copolymer having the following typical properties:

| | |
|---|---|
| Viscosity at 77 f, centistokes | 325 |
| Specific Gravity at 77 F | 1.07 |
| Refractive Index at 77 F | 1.4540 |
| Color, Gardner Scale | 4 |
| Hydroxyl Content (Phthalic Anhydride Method) percent | 1.8 |

Another class of surfactants comprises alkylene oxide adducts of ethylene diamine having generally the formula:

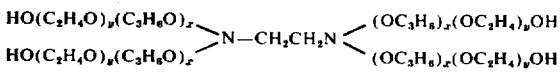

Still another class of surfactants comprises the polyoxyalkylene esters of long chain fatty acids and sorbitan such as polyoxyethylene(20)sorbitan monolaurate, polyoxyethylene(4)sorbitan monolaurate, polyoxyethylene(20)sorbitan tristearate, polyoxyethylene(20)sorbitan monooleate, polyoxethylene(5)sorbitan monooleate and polyoxyethylene(20)sorbitan trioleate.

Although the polyurethane foam compositions of this invention may use water as a foaming agent, a halogenated saturated aliphatic hydrocarbon or a mixture of such halogenated saturated aliphatic hydrocarbons is preferred, for example, trichlorofluoromethane (Freon 11); monochloroethane; monochloromonofluoroethane; 1,2-dibromo, 1,1,2,2-tetrafluoroethane; 1,1,2-trichloro 1,2,2-trifluoroethane; 1,1,2,2-tetrafluoro 1,2-dichloro-ethane; 1,2-difluoro-1,1,2,2-tetrachloroethane; dichloromethane; dibromomethane and their mixtures. These materials may be present in nearly trace amounts up to about 50% by weight of the hydroxyl-bearing compound, as desired.

Preferably, though not necessarily, the foams of the present invention may be prepared by reacting the polyol blend with an organic polyisocyanate in the presence of at least one amine catalyst, a surfactant and a blowing agent.

The foams of this invention are self-extinguishing polyurethane foams meeting the fire-retardant requirement of ASTM-D-1692-59T and a fire-retardant test similar to the Bureau of Mines' Flame Penetration Test which is conducted as follows:

A foam specimen measuring 6 inches × 6 inches × 1 inch is mounted horizontally on a transite heat shield with a single sheet of Number 5 filter paper sandwiched between the foam and the heat shield. The heat shield measures 7 inches × 7 inches × ¼ inch and contains a 1½ inch diameter hole in its center. A National Welding Equipment Company, Type 3A Blowpipe Torch, equipped with a size Number 2 nozzle (for gas and air) is lit and adjusted to a flame temperature of 1177° ± 15°C., as measured with a chromel alumel thermocouple attached to a Weston Electric Ammeter Model 301. The flame calibration is performed in a heat shield to avoid air draft flame temperature variations. After the temperature is adjusted the readings on two differential manometers is noted and maintained at these levels to assure flame temperature stability. A second heat shield, without any holes, is placed over the foam sample and the adjusted pencil tip flame placed over the sample and aligned with the hole in the lower heat shield. The upper heat shield is removed and simultaneously a stopwatch is started. The time required to burn through the foam as indicated by the igniting or charring of the filter paper when viewed through the hole in the bottom heat shield, is the burn through time.

To better enable those skilled in the art to practice the invention contained herein the following is a representative example of preparing a flame-retardant polyurethane foam within this invention:

EXAMPLE 8

Formulation

| Component A | Percent by Weight |
|---|---|
| polyphenyl polymethylene polyisocyanate (MONDUR MR) | 44.5 |

| Component B Polyol Blend of Example 1 | 38.8 |
|---|---|

| Component B | Percent by Weight |
|---|---|
| Organo-silicon surfactant (Union Carbide L-5310) | 0.6 |
| Dimethyl ethanol amine | 1.0 |
| Dibutyl tin dilaurate | 0.1 |
| Freon R-11-B | 15.0 |

(FREON is the trademark of E. I. duPont de Nemours and Company).

Component B of the above formulation is prepared by mixing together each of the ingredients sequentially in the amount specified and then blending the resulting mixture in a suitable container with a high speed mixer. To Component B is then added the specified amount of Component A, which is the isocyanate. The mixture of the components is stirred for 10 seconds at high speed on a high speed mixer, after which it is poured into a one-gallon paper cup. Within 21 seconds the foaming action has visibly commenced (cream time), within 72 seconds the top portion of the foam is set and nonsticky (tack time), and within 110 seconds the foaming is complete as noted by the foam no longer rising (foam time). The flame-retardancy of the foam is then tested by ASTM method 1692-59T with the following results:

| Seconds | Inches |
|---|---|
| 25 | 3/4 |
| 28 | 3/4 |
| 29 | 7/8 |

The foregoing results indicate that the foam formulation is a flame-retardant foam.

The following are representative examples of foam formulations which may be produced by following th general procedure of Example 8. The order of mixing the ingredients of Component B is immaterial.

EXAMPLE 9

| Component A | Percent by Weight | | |
|---|---|---|---|
| polyphenyl polymethylene polyisocyanate (MONDUR MR) | 45.5 | | |
| Component B | | | |
| Polyol Blend of Example 2 | 37.8 | | |
| L-5310 Surfactant | 0.6 | | |
| Dimethyl Ethanol Amine | 1.0 | | |
| Dibutyl Tin Dilaurate | 0.1 | | |
| Freon R-11-B | 15.0 | | |
| Self-Extinguishing Properties- ASTM D-1692 Test: | | | |
| Time (seconds) | 23 | 22 | 23 |
| Inches | 0.75 | 0.75 | 0.875 |

EXAMPLE 10

| Component A | Percent by Weight |
|---|---|
| PAPI | 38.0 |
| Component B | |
| Polyol blend of Example 3 | 45.1 |
| Organo-Silicon Surfactant (Dow-Corning DC-195) | 0.6 |
| Dimethyl Ethanol Amine | 1.0 |
| Triethylene Diamine (33% in dipropylene glycol) | 0.3 |
| Freon R-11-B | 15.0 |

EXAMPLE 11

| Component A | Percent by Weight |
|---|---|
| MONDUR MR | 45.3 |
| Component B | |
| Polyol Blend of Example 4 | 38.8 |
| Organo-Silicon Surfactant (Dow Corning DC-195) | 0.6 |
| Triethylene Diamine (33% in dipropylene glycol | 0.3 |
| Freon R-11-B | 15.0 |

EXAMPLE 12

| Component A | Percent by Weight |
|---|---|
| PAPI | 42.8 |
| Component B | |
| Polyol Blend of Example 6 | 40.3 |
| Dow-Corning-195 Surfactant | 0.6 |
| Dimethylethanol Amine | 1.0 |
| Triethylene Diamine (33% in dipropylene glycol) | 0.3 |
| Freon R-11-B | 15.0 |

EXAMPLE 13

| Component A | Percent by Weight |
|---|---|
| MONDUR MR Isocyanate | 54.0 |
| Component B | |
| Polyol Blend of Example 7 | 29.0 |
| L-5310 Surfactant | 1.0 |
| Triethylene Diamine (33% in dipropylene glycol) | 1.0 |
| Freon R-11-B | 15.0 |

EXAMPLE 14

| Component A | Percent by Weight |
|---|---|
| PAPI Isocyanate | 46.5 |
| Component B | |
| Polyol Blend of Example 8 | 36.5 |
| L-5310 Surfactant | 1.0 |
| Triethylene Diamine (33% in dipropylene glycol) | 1.0 |
| Freon R-11-B | 1.0 |

It will be evident that although this invention has been described with reference to specific polyol blends, the substitution within this blend of any second polyhydroxy material which together with a DBBD in the proportions indicated supra achieves a hydroxyl number within the specified range is a polyhydroxy blend within the scope of the invention, and such interchange and modification to form a large variety of equivalent polyol blends useful in the preparation of fire-retardant polyurethane foams is contemplated.

Having thus described our invention, we claim:

1. A flame-retardant polyurethane foam composition formed in the presence of a blowing agent which comprises the product formed by the reaction of an organic di- or poly-isocyanate and a polyol blend comprised of a mixture of 2,3-dihalo-2-butene-1,4-diol and a polyhydroxy compound selected from the group consisting of sorbitol, mono- and di-saccharides and alkoxylated sorbitol and mono- and di-saccharides containing up to 10 oxyalkylene or oxyarylene groups per hydroxyl groups of the sorbitol and mono- and di-saccharide wherein the hydroxyl number of said blend is from about 300 to about 600 and said 2,3-dihalo-2-butene-1,4-diol is present at a concentration of from about 15% to 40% based on the weight of the polyol blend.

2. A flame-retardant polyurethane foam composition of claim 1 wherein the polyol blend is comprised of 2,3-dibromo-2-butene-1,4-diol and polyoxypropylene sorbitol wherein the oxypropylene content is from 2 to 20 mols per mol of sorbitol.

3. A flame-retardant polyurethane foam composition of claim 1 wherein the 2,3-dihalo-2-butene-1,4-diol is 2,3-dibromo-2-butene-1,4-diol.

4. A flame-retardant polyurethane foam composition of claim 1 wherein the 2,3-dihalo-2-butene-1,4-diol is 2,3-dibromo-2-butene-1,4-diol which is present at a concentration of about 25 percent based on the weight of the polyol blend.

5. A flame-retardant polyurethane foam composition of claim 1 wherein the polyol blend is comprised of dibromobutenediol and polyoxypropylene sucrose wherein the oxypropylene content is from 2 to 20 mols per mol of sucrose.

* * * * *